April 29, 1952  L. BANIDES  2,594,611
SELF-ACTING LUBRICATING COCK
Filed May 21, 1945  3 Sheets-Sheet 1
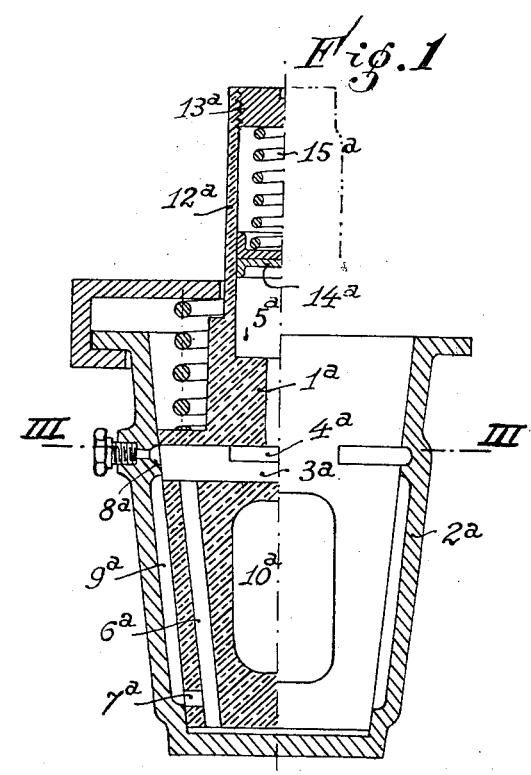
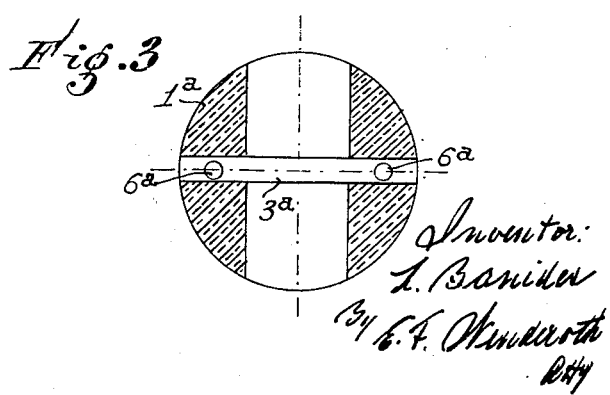

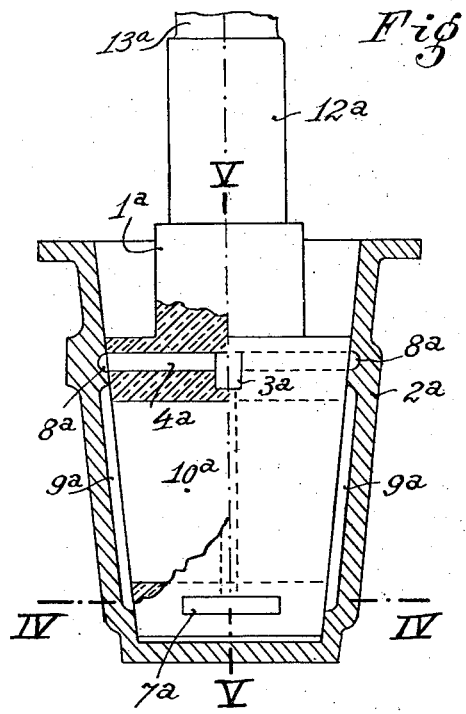
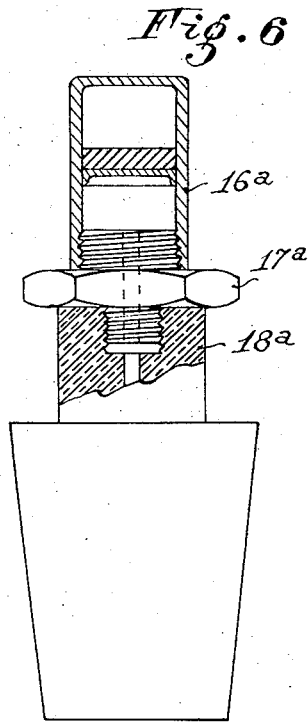
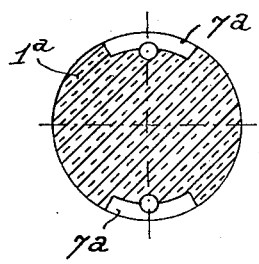
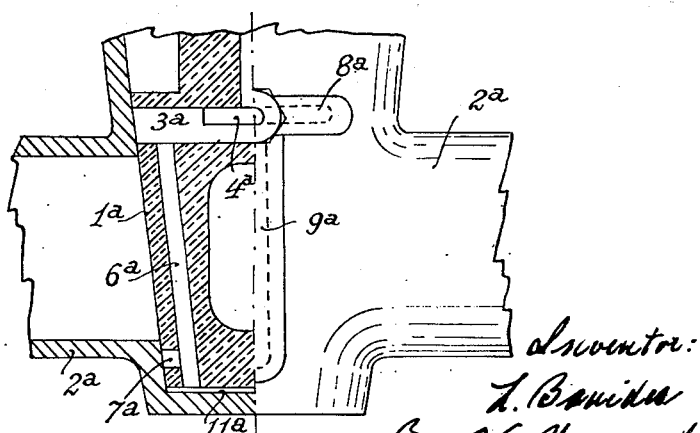

April 29, 1952  L. BANIDES  2,594,611
SELF-ACTING LUBRICATING COCK

Filed May 21, 1945  3 Sheets-Sheet 3

Patented Apr. 29, 1952

2,594,611

UNITED STATES PATENT OFFICE 2,594,611

SELF-ACTING LUBRICATING COCK

Lucien Banides, Ault, France

Application May 21, 1945, Serial No. 594,966
In France March 2, 1942

4 Claims. (Cl. 251—93)

1

The present invention relates to a self-acting lubricating cock having a reservoir for lubricant to provide adequate lubricant at all times. In such a cock, the main difficulty encountered is obtaining proper lubrication of all parts without allowing any flow of lubricant in the port of the plug or spanner.

According to the invention this is obtained by providing in the inner wall of the body portion of the cock grooves, above and below the port and others in the longitudinal direction of the walls. The plug or spanner also has grooves arranged in such a way that the longitudinal grooves of the body of the cock are fed only in the opening position of the cock; the plug or spanner comprising furthermore grooves or channels forming a reservoir for lubricant.

The invention can be effected in several ways; however it is desirable that lubrication be effected in any position of the cock. In this manner there is avoided sticking on account of a protracted positioning of the cock, in the same position without lubrication.

To this end, at least two lubricating circuits may be provided; one corresponding to the opening position and the other to the closing position, the last circuit being without any connection with the grooves which in this position, register with the ports of the plug.

The invention will be further understood by reference to the following detailed description taken with the accompanying drawings, in which:

Fig. 1 is a partial vertical axial half sectional view and an internal half elevational view of the body of a cock made according to the present invention and shown in its open, position;

Fig. 2 is a corresponding partial sectional and partial elevational view showing the spanner of Fig. 1 in closing position;

Figs. 3 and 4 are horizontal sectional views taken respectively on lines III—III (from above) and IV—IV (from below) of Figs. 1 and 2.

Fig. 5 is a vertical axial half-sectional view taken on the line V—V of Fig. 2 and half elevational, showing the spanner in closing position;

Fig. 6 is a vertical axial half sectional and half elevational view of an embodiment of the lubricant container;

Figure 7:
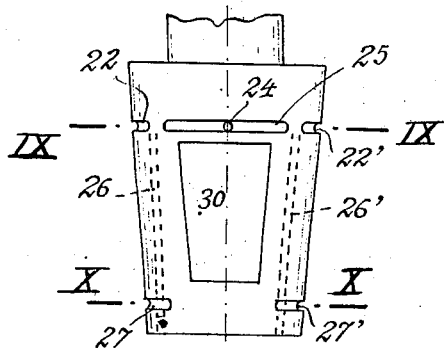
Figs. 7 and 8 are elevational views of the spanner.
Figure 8:
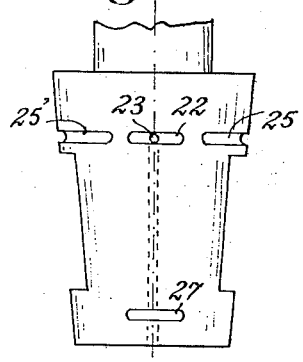
Figure 11:
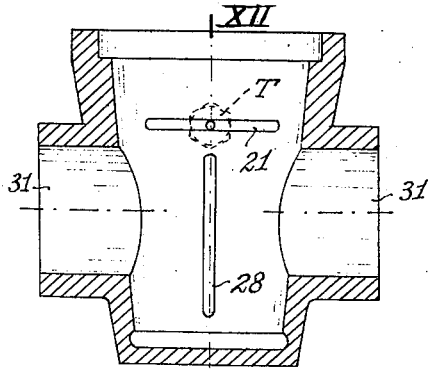
Figure 12:
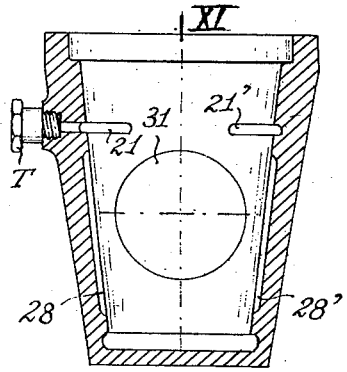
Figure 9:
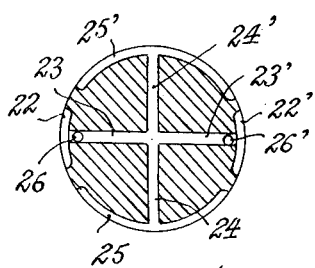
Figs. 9 and 10 are horizontal sectional views of the spanner taken on lines IX—IX and X—X respectively of Fig. 7, and Figs. 11 and 12 are vertical sectional views of the body of the cock of another embodiment taken
Figure 10:
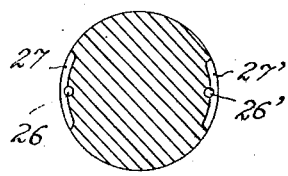

2 on lines XI—XI and XII—XII of Figs. 12 and 11, respectively.

In the embodiment shown in Figs. 1 to 5, there is an arrangement of grooves, openings and the like in such a manner that plentiful lubrication is possible in all positions of the cock, and the lubricant reservoir cannot be emptied into the spanner port.

A chamber constituting the lubricant reservoir is formed by the whole of the openings $3a$ and $4a$ provided in the spanner and in the container $5a$.

The openings are connected to each other and to the lubricant container $5a$ in the center of the spanner. One opens in the axial plane of the ports, the other in a plane at right angles thereto and at different heights.

On the other hand, the openings $3a$ are continued on to the lower part of the spanner through the channels $6a$ and $7a$.

In its internal wall the body of the cock has grooves $8a$ and $9a$ which are separated, one from the other, and corresponding to two different lubricating circuits.

The grooves $9a$ are connected to the lubricant reservoir only when the spanner is in the opening position, as shown in Fig. 1. As shown, the spanner must be exactly or approximately in the open position for establishing this connection. Without departing from the scope of the invention, the registering surface of the opening $3a$ and of the groove $9a$ could be laterally widened for securing lubrication during a larger angular displacement, the extreme limit being determined by the beginning or register between the ports $10a$ and the groove $9a$.

In comparing Figs. 1 and 2 it will be seen that when the spanner is in its closed position (Fig. 2) or near the same, the lubricant reservoir is no longer connected to the groove $9a$ and cannot consequently empty into the port $10a$ of the spanner. In this position the ports $4a$ register with the circumferential grooves $8a$ of the body of the cock and, through the openings $3a$, $6a$ and $7a$ they are connected to the lower part of the latter. Since the second circuit is not connected to the groove $9a$ (Fig. 2) there is no danger of discharge of lubricant into the port $10a$ in the closed position.

The port $4a$ is of a predetermined length and the groove $8a$ is horizontal and extends over only a relatively small part of the periphery. They could however be differently shaped as will be apparent from the following description.

The outer end of the perforation $4a$ must not extend below the upper end of the groove $9a$, so that they can never register with one another and the groove 8a can be widened as much as desired, but it must not have its outlet in the groove 9a in any of its positions.

The opening 6a can open freely in the base face of the spanner, thus providing the advantage of forming a continuous film 11a of lubricant, in all positions, in the bottom of the body of the cock. A horizontal groove of such a width as not in any case to extend so far as to open in the groove 9a could also be provided in the internal faces of the body of the cock, in front of the opening 7a.

The lubricant reservoir can comprise a chamber formed in the rod of the spanner. In a first embodiment shown in Fig. 1, the body 1a of the spanner has at its top a hollow cylindrical extension 12a, which contains a piston 14a maintained by a spring 15a. At the top, this upper extension ends in a square piece 13a serving for the manipulation of the spanner.

In the embodiment shown in Fig. 6, the container 16a is secured on the spanner through a machined piece 17a, bored in its center and comprising operating means—not shown—acting upon the socket 18a. This arrangement is more simple to machine. On the other hand, it is possible to replace the metal sleeve 16a by a container having any convenient shape and made of any convenient material, for instance of glass to allow watching the lubricant by direct viewing.

The filling of the reservoir is performed by means of any convenient lubricators such as the type in current use having a retaining ball counterbalanced by a spring and arranged either laterally in the body of the cock as shown in Fig. 1 or in the lubricant container, or in any other convenient place.

In the embodiment shown in Figs. 7 to 12, the body of the cock has two grooves 21 and 21' arranged above the port 30 and each of them extending along the quarter of the circumference. One of the grooves is directly fed by the lubricator (Figs. 2 and 3) and the other is supplied with the lubricant needed by means of the plug when the same is in a given position.

The body of the cock, furthermore has vertical grooves 28 and 28' which extend over substantially the whole height of the body but not reaching either the grooves 21 and 21', or the bottom.

The plug or spanner has on one hand two horizontal grooves 25 and 25', located at the same height as the grooves 21 and 21' of the body, placed above the ports 30, 31 and extending along about a quarter of the circumference, and on the other hand two shorter grooves 22 and 22', inserted between the grooves 25 and 25', that is, in the solid sides of the plug. The grooves 25 and 25' are connected to each other by channels 24, 24' and the grooves 22 and 22' by the channels 23 and 23', the whole of which serves as container for lubricant, and at the same time as lubricant circulating conduits.

The plug furthermore has, at its lower part, grooves 27, 27' permanently connected to the grooves 22, 22' and to the channels 23, 23' by means of the channels 26, 26' vertically bored in the body of the plug.

The operation of this cock is as follows:

The cock being open the lubricant fed in by lubricator T enters into the groove 21 of the body, then into the groove 22 of the plug.

Through the channels 23, 23', 24 and 24', bored through the top of the plug, the lubricant reaches the grooves 25, 25', and 22' of the plug and 21' of the body of the cock.

Through the channels 26 and 26', the lubricant is supplied on one hand to the chamber formed below the plug and on the other hand to the grooves 27 and 27' of the plug from where it finally flows into the grooves 28 and 28' of the body of the cock.

During the beginning of the closing motion of the cock, the grooves 27 and 27' remain facing the grooves 28 and 28' and the latter thus begin to be supplied with lubricant under pressure.

The length of the grooves 27 and 27' of the plug is so determined that the grooves are no longer communicating with the grooves 28 and 28' of the body of the cock at that time, at which, the guard between the said last grooves and the fluid circulating opening of the plug is insufficient for opposing the injection of lubricant in the passage.

When the cock is closed, the lubricant follows the same circuits, except that it cannot penetrate in the grooves 28 and 28' of the body which are no longer connected to the grooves 27 and 27' of the plug.

Consequently, lubricant under pressure can be fed in by the lubricator whatever may be the position of the cock either open or closed or intermediate, without any danger that the lubricant can enter into the conduit or into the hole of the plug.

Any danger of sticking is avoided owing to the fact that the lubricant which is introduced under pressure below the plug tends to lift the same and forces spacing between the plug and body.

It thus appears that the lubricating circuit corresponding to the closing position of the cock is not connected to the grooves 28 and 28' which in this position are in register with the ports of the spanner.

I claim:

1. A self-acting lubricating cock comprising a body portion, a rotatable plug in said body portion having a port therein, at least one circumferential groove on the internal wall of said body portion, said circumferential groove being spaced from said port in said plug, longitudinal grooves on said internal wall of said body portion stopping short of said circumferential groove, circumferential grooves on said plug registering with said groove in said body portion at desired positions, a single lubricant reservoir in said plug spaced above said port, perforations in said plug connecting said reservoir with said grooves to form two separate alternatively operable lubricating circuits, one of said circuits being operable when said cock is in open position, and the other said circuit being operable when said cock is in closed position, said last named circuit having no connection with said longitudinal grooves, whereby an adequate supply of lubricant will be available in all positions of said cock without unwarranted flow of lubricant through said port.

2. In a self-acting lubricating cock as claimed in claim 1, said perforations in said plug comprising two crossed horizontal perforations in the upper part thereof, one said horizontal perforation at the ends thereof forming circumferential grooves on said plug and registering with said longitudinal grooves in said body portion when said cock is in open position for lubrication thereof, the other said horizontal perforation being connected to other portions of said circumferential grooves in said plug not registering with said longitudinal grooves in said body portion providing lubrication of said cock in closed position.

3. In a self-acting lubricating cock as claimed in claim 2, vertical perforations in said plug connected to portions of said circumferential groove spaced from said port in said plug and registering with said longitudinal grooves in said body member in open position of said cock and extending below said plug providing lubrication to the lower portion of said body member.

4. A self-acting lubricating cock comprising a body portion, a rotatable plug in said body portion having a port therein, discontinuous radially spaced circumferential grooves on the internal wall of said body portion, said circumferential grooves being spaced above said port in said plug, longitudinal grooves on the internal wall of said body portion stopping short of said circumferential grooves, a single lubricant reservoir in said plug above said port and spaced therefrom, said plug having perforations therein comprising two crossed horizontal channels in the upper part of said plug communicating with said reservoir, one said horizontal channel at the ends thereof forming circumferential grooves on said plug and being registerable with said circumferential grooves in said internal wall of said body portion, said plug having a vertical channel opening into said horizontal channels at one end thereof and opening through the bottom of said plug at the other end thereof, discontinuous radially spaced circumferential grooves on said plug in proximity to the bottom thereof communicating with said vertical channel and said longitudinal grooves, said circumferential grooves on said plug registering on said grooves in said body portion at desired positions, said grooves and said channels interconnected therewith in said plug forming two alternative separate lubricating circuits for coaction with said grooves in said body portion, one of said circuits being operable when said cock is in open position, and the other said circuit being operable when said cock is in closed position, said last named circuit having no connection with said longitudinal grooves, whereby an adequate supply of lubricant will be available in all positions of said cock without unwarranted flow of lubricant through said port.

LUCIEN BANIDES.

REFERENCES CITED

The following references are of record in the file of this patent:

UNITED STATES PATENTS

| Number | Name | Date |
|---|---|---|
| 1,781,821 | Nordstrom | Nov. 18, 1930 |
| 2,058,747 | Wilkins | Oct. 27, 1936 |
| 2,099,169 | MacClatchie | Nov. 16, 1937 |
| 2,281,697 | Kerr | May 5, 1942 |
| 2,296,650 | Mueller et al. | Sept. 22, 1942 |

FOREIGN PATENTS

| Number | Country | Date |
|---|---|---|
| 414,682 | Great Britain | of 1934 |